UNITED STATES PATENT OFFICE.

WILLIAM H. KENNEDY AND GILBERT E. BAILEY, OF LOS ANGELES, CALIFORNIA, ASSIGNORS TO AMERICAN SAFETY EXPLOSIVES COMPANY, A CORPORATION OF DELAWARE.

PROCESS FOR EXTRACTING POTASH AND OTHER VALUES FROM TOBACCO.

1,253,497.   Specification of Letters Patent.   Patented Jan. 15, 1918.

No Drawing.   Application filed March 19, 1917.   Serial No. 155,939.

*To all whom it may concern:*

Be it known that we, WILLIAM H. KENNEDY and GILBERT E. BAILEY, both citizens of the United States, residing at Los Angeles, in the county of Los Angeles and State of California, have invented a new and useful Process for Extracting Potash and other Values from Tobacco, of which the following is a specification.

Our invention relates to the extraction of valuable ingredients from the parts of tobacco plants not ordinarily used in the manufacture of cigars, cigarettes, chewing tobacco, and similar articles, being more particularly a process for the extraction of values from the stems, ribs and leaves of the tobacco plant.

The composition of the tobacco plant varies according to the botanical variety of the plant, also the climate and the soil where grown. In general the percentage of potash ($K_2O$) varies from four to ten per cent., the plant also containing albuminoids, cellulose, resins, gums, nicotin, a number of organic acids, and more or less mineral matter. When the leaves, stalks and stems are burned to an ash, the principal ingredients of the ash are potash ($K_2O$), varying from twenty-five to forty per cent.; lime ($CaO$) from thirty to forty per cent.; magnesia ($MgO$) from five to twelve per cent.; small amounts of alumina; iron, and soda; and minor amounts of chlorin, phosphoric anhydrid and sulfuric anhydrid; but the volatile and organic matter is destroyed and lost, and as the potash in the plant exists in combination with the organic acids, the potash is only partially converted into carbonate mixed with soluble compounds of lime and magnesia, which are expensive to separate, and as a consequence considerable potash is lost.

The object of our invention is to recover the potash, the volatile portions of the plant, and the gums and resins.

Our process is carried out in the following manner: The tobacco is first percolated with denatured alcohol which forms a concentrated solution or extract containing the nicotin of the plant, which solution is readily salable for making sheep dip, insecticides and similar articles. The residue is then mixed with charcoal and placed in a retort, heat applied to the retort, and the remaining alcohol driven off to be used for percolating a new batch of tobacco. The amount of charcoal used is determined by approximate analysis of the charges, but it may be used in large excess, the percentage being a matter of economy, as the chemistry of the process does not require close figuring, it being essential, however, to have the charcoal in excess of the organic matter. After the alcohol is recovered, the heat is raised so that the gums, resins and mixed organic substances come over and are saved, being useful for various purposes well known to one skilled in the art. Air is then admitted to the retort and the heat raised to a full red heat, yet not enough to cause fusion or slagging of the mass. As the charcoal is in excess, the organic matter is completely destroyed and the potash, lime, magnesia and other minerals present are converted into carbonates. The residue is then taken out of the retort and leached with boiling hot water in which the potassium carbonate is soluble, while the calcium and magnesium carbonates are but slightly affected. They are, therefore, easily separated and the solution of potassium carbonates freed from its impurities and crystallized by standard processes well known to those skilled in the art of chemistry.

We claim as our invention:

1. The process for recovering values from tobacco, which consists in percolating the tobacco with alcohol, withdrawing the percolated extracts, distilling gums and resins from the residue, and roasting the residue after such distillation in the presence of charcoal to form potassium carbonate.

2. The process for recovering values from tobacco, which consists in percolating the tobacco with alcohol, withdrawing the percolated extracts, distilling gums and resins from the residue and roasting the residue after such distillation in the presence of charcoal to form carbonates, then leaching such carbonates with hot water to form a solution of potassium carbonate.

3. The process for obtaining potassium from tobacco, which consists in roasting the tobacco in the presence of charcoal to form carbonates and then leaching such carbonates with hot water to separate the potassium carbonate into a solution.

4. The process for obtaining values from tobacco, which consists in recovering the extracts and resins from the tobacco and then recovering the potash from the residue, as described.

In testimony whereof, we have hereunto set our hands at Los Angeles, California, this 9th day of March, 1917.

WILLIAM H. KENNEDY.
GILBERT E. BAILEY.